United States Patent [19]

Shahani et al.

[11] Patent Number: 5,715,155
[45] Date of Patent: Feb. 3, 1998

[54] RESONANT SWITCHING POWER SUPPLY CIRCUIT

[75] Inventors: Hamid R. Shahani, Charlesbourg, Canada; Majid Shahani, Spanga, Sweden

[73] Assignee: Norax Canada Inc., Bernieres, Canada

[21] Appl. No.: 741,330

[22] Filed: Oct. 28, 1996

[51] Int. Cl.$^6$ .................. H02M 7/538; H02M 3/335
[52] U.S. Cl. ............................................. 363/132; 363/17
[58] Field of Search .......................... 363/17, 98, 132; 323/222

[56]  References Cited

U.S. PATENT DOCUMENTS

| | | | |
|---|---|---|---|
| 4,085,300 | 4/1978 | MacKenzie et al. | 219/10.49 |
| 4,227,243 | 10/1980 | Gurwicz et al. | 363/132 |
| 4,525,774 | 6/1985 | Kino et al. | 363/17 |
| 4,533,986 | 8/1985 | Jones | 363/17 |
| 4,570,211 | 2/1986 | Manda et al. | 363/23 |
| 4,663,699 | 5/1987 | Wilkinson | 363/17 |
| 4,679,129 | 7/1987 | Sakakibara et al. | 363/17 |
| 4,860,184 | 8/1989 | Tabisz et al. | 363/132 |
| 5,065,301 | 11/1991 | Shioya et al. | 363/17 |
| 5,243,509 | 9/1993 | Laeuffer | 363/17 |
| 5,245,520 | 9/1993 | Imbertson | 363/17 |
| 5,402,329 | 3/1995 | Wittenbreder, Jr. | 363/16 |
| 5,438,498 | 8/1995 | Ingemi | 363/17 |
| 5,442,540 | 8/1995 | Hua et al. | 363/98 |
| 5,448,467 | 9/1995 | Ferreira | 363/132 |
| 5,500,792 | 3/1996 | Jeon et al. | 363/98 |
| 5,625,538 | 4/1997 | Lee et al. | 363/98 |

FOREIGN PATENT DOCUMENTS 2199454 of 1988 United Kingdom .

OTHER PUBLICATIONS

Can. J. Elect. & Comp. Eng., vol.20, No. 4, 1995, Comparison of resonant converter topologies, 1995, pp.193 to 201 inclusively.

Spellman High Voltage Electronics Corporation, The Ideal Power Source for CW Magnetrons, Reprinted from the Proceedings of the 29th Microwave Power Symposium, Jul. 1994.

Primary Examiner—Stuart N. Hecker
Attorney, Agent, or Firm—Darby & Darby

[57] ABSTRACT

The resonant switching power supply circuit comprises positive and negative DC input terminals. First and second switching elements are connected in series between the DC input terminals. Each switching element has a control input for receiving a control signal controlling a duty cycle of the switching element. A first capacitor is connected between the DC input terminals. Second and third capacitors are connected in series between the DC input terminals. A first pair of reverse biased rectifying elements in series is connected between the DC input terminals. Each rectifying element of the first pair is connected in parallel with a respective one of the switch elements. A second pair of reverse biased rectifying elements in series is connected between the DC input terminals. Each rectifying element of the second pair is connected in parallel with a respective one of the second and third capacitors. The circuit also comprises a transformer including a primary winding having opposite winding ends connected between the rectifying elements of the first pair and between the rectifying elements of the second pair respectively, and a secondary winding having opposite winding ends. A pair of output terminals is connected to the winding ends of the secondary winding of the transformer respectively, to supply power. The resonant switching power supply circuit can be used as a power inverter or converter.

12 Claims, 6 Drawing Sheets

RESONANT SWITCHING POWER SUPPLY CIRCUIT

FIELD OF THE INVENTION

This invention relates in general to power supply circuits and more particularly to a resonant switching power supply circuit that can be used as a power converter or a power inverter for inductive heating applications.

BACKGROUND OF THE INVENTION

Switch mode power supplies (SMPS) are widely used in power electronics, in areas like inductive heating for melting, heat treatment, hot plates, etc., and in areas where voltage or current must be converted such as welders, battery chargers, plasma sources, lasers, DC magnetron, microwave magnetron, etc. The presently known SMPS circuits are built around flyback, forward or push pull inverters, where transistors must block up to 2–3 times the supply voltage. This restricts the use of these types of circuits in induction heating or other applications where high supply voltage must be used due to a high demand of power.

In the other switched mode technique, known as bridge switched mode, one of the main advantages is that voltage applied on the switching transistors does not exceed the supply voltage. Two popular configurations are the full bridge and half bridge. In the full bridge configuration, four switching elements are used and the voltage applied on the induction coil and/or primary of the transformer is equal to the supply DC voltage. In the half bridge configuration, two transistors at one side of the bridge are replaced with two main electrolytic capacitors which divide the supply DC voltage into half. These main electrolytic capacitors have the capacity of some hundreds of µF and during operation, the voltage across these capacitors remains virtually constant or with very small voltage variations. Therefore, the transistors apply half the voltage across the induction coil and/or primary of the transformer while the transistors must stand full voltage.

Both full and half bridge SMPS as converter or as inverter for induction heating may work with either fixed or variable frequency, and the output power is controlled by either changing the duty cycle (the ON state period) of the transistors or by varying the switching frequency of the bridge. In some other approaches, the output power is controlled by changing the magnitude of the supply DC voltage on the bridge by chopping the input AC mains. This method, obviously requires additional switching devices such as thyristors and induces more stress on the main.

A major disadvantage of the above mentioned circuits is due to switching losses in the transistors associated with "hard switching".Switching losses at high frequency, high current and high voltage applications require implementation of more powerful transistors and heat sinks which increase the complexity of the system's design, weight and cost.

There have been many attempts in the past to use the benefits of zero switching of the transistors, using resonance circuits. In such cases, additional LC circuits are placed in the bridge configuration either as series or parallel arrangements in various combinations. This produces some disadvantages, like increased complexity of the circuits and their design, extra losses in the resonant circuits, and to some extent, limitation of the performances at higher power conversions. All this together makes the systems complex, bulky and more expensive.

Examples of prior art circuits can be found in U.S. Pat. Nos. 4,085,300 (MacKenzie et al.), 4,227,243 (Gurwicz et al.), 4,525,774 (Kino et al.), 4,533,986 (Jones), 4,570,211 (Manda et al.), 4,663,699 (Wilkinson), 5,065,301 (Shioya et al.), 5,243,509 (Laeuffer), 5,245,520 (Imbertson), 5,402,329 (Wittenbreder Jr.), 5,438,498 (Ingemi), 5,442,540 (Hua et al.), 5,500,792 (Jeon et al.), in UK patent application No. 2,199,454 (Tanaka et al.) filed on Nov. 30, 1987, in an article entitled "Comparison of resonant converter topologies", Cyr et al., Can. J. Elect. & Comp. Eng., Vol. 20, No. 4, 1995, pp. 193–201, and in an advertisement from Spellman High Voltage Electronics Corporation entitled "The Ideal Power Source for CW Magnetrons".

SUMMARY OF THE INVENTION

One object of the invention is to provide an improved switching power supply circuit.

A subsidiary object of the invention is to provide a switching power supply circuit which is more compact than those known in the art, and provides high frequency power supply both as converter and also inverter for induction heating with a superior ratio of watts of generated power per volume and/or weight.

Another subsidiary object of the invention is to provide a switching power supply circuit that can be used as a power converter or inverter, with reduced transistor losses, harmonic operation of the bridge and reduced EMI.

Another subsidiary object of the invention is to provide a switching power supply circuit which does not need external transistor protection such as shunts, inductors, etc.

Another subsidiary object of the invention is to provide a switching power supply circuit which remains unaffected by load variations, and saves the unused energy from the load.

Another subsidiary object of the invention is to provide a switching power supply circuit which requires transistors having lower power endurance than those in the prior art circuits.

In accordance with one aspect of the present invention, there is provided a resonant switching power supply circuit comprising:

positive and negative DC input terminals;

first and second switching elements connected in series between the DC input terminals, each switching element having a control input for receiving a control signal controlling a duty cycle of the switching element;

a first capacitor connected between the DC input terminals;

second and third capacitors connected in series between the DC input terminals;

a first pair of reverse biased rectifying elements connected in series between the DC input terminals, each rectifying element of the first pair being connected in parallel with a respective one of the switch elements;

a second pair of reverse biased rectifying elements connected in series between the DC input terminals, each rectifying element of the second pair being connected in parallel with a respective one of the second and third capacitors;

a transformer having a primary winding connected between the rectifying elements of the first pair and the rectifying elements of the second pair, and a secondary winding having opposite winding ends; and a pair of output terminals connected to the winding ends of the secondary winding of the transformer respectively, to supply power.

Preferably, the rectifying elements are free wheeling diodes, and the switching elements are transistors.

Conveniently, the circuit can be used as an inverter for a resonant circuit connected to the output terminals, the resonant circuit having a predetermined resonance frequency. In such a case, the second and third capacitors and the primary winding of the transformer have capacitance and inductance values chosen so that at the end of each duty cycle of the switching elements and when the switching elements are operated alternately at a frequency higher and close to the resonance frequency of the resonant circuit, one of the second and third capacitors is substantially fully discharged and the other one of the second and third capacitors is substantially fully charged to supply a voltage to the primary winding of the transformer.

Conveniently, the circuit can be used as a converter comprising:

a rectifier circuit having an input connected to the winding ends of the secondary winding of the transformer, and an output; and a filter circuit having an input connected to the output of the full bridge rectifier, and an output connected to the output terminals, to produce a DC supply voltage.

A voltage multiplier may replace the rectifier-filter arrangement. The multiplier has an input connected to the winding ends of the secondary winding of the transformer, and an output connected to the output terminals, to produce a high DC supply voltage.

Amongst the many advantages of the present invention, an efficient inverter power supply circuit can be provided for induction heating, using existing components. The circuit can be operated at switching rates continuous from audible frequencies to 500 KHz or higher, with a power output of tens of watts to many tens of thousands of watts. The circuit can be built more compact with less components and thus less weight and costs in comparison with conventional circuits.

BRIEF DESCRIPTION OF THE DRAWINGS

A detailed description of the preferred embodiments is provided herein below with reference to the following drawings, in which like numbers refer to like elements.

DETAILED DESCRIPTION OF THE PREFERRED EMBODIMENTS

Figure 1:
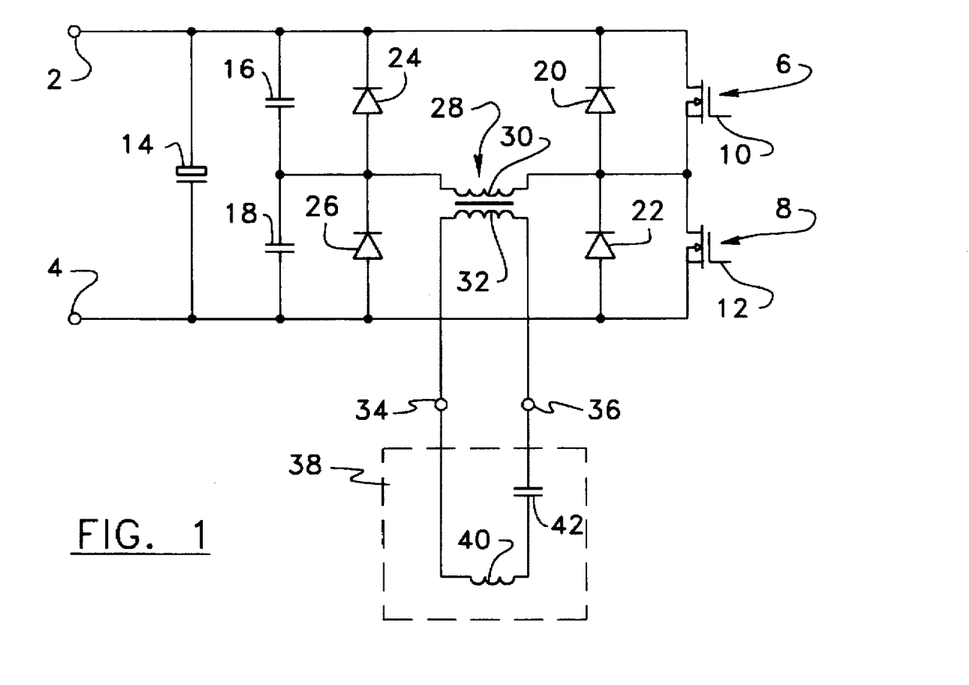
FIG. 1 is a schematic diagram of a switching power supply circuit used as an inverter according to the invention, connected to a resonant circuit.
Figure 2:
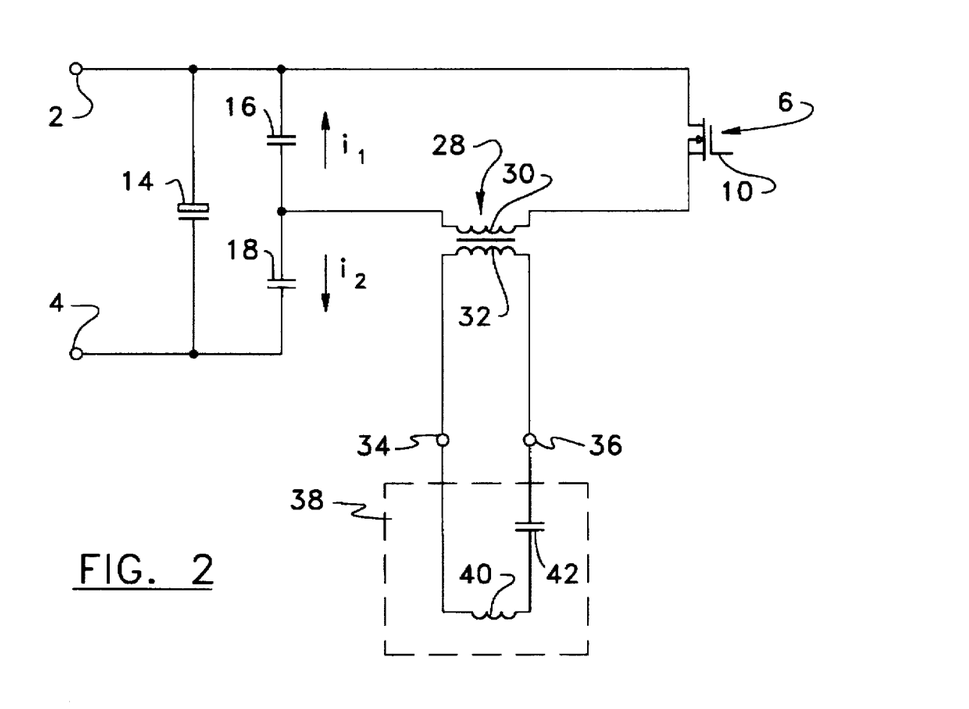
FIG. 2 is a schematic diagram of the parts of the circuit shown in FIG. 1 that are in operation during the duty cycle of one of the switching elements.
Figure 3:
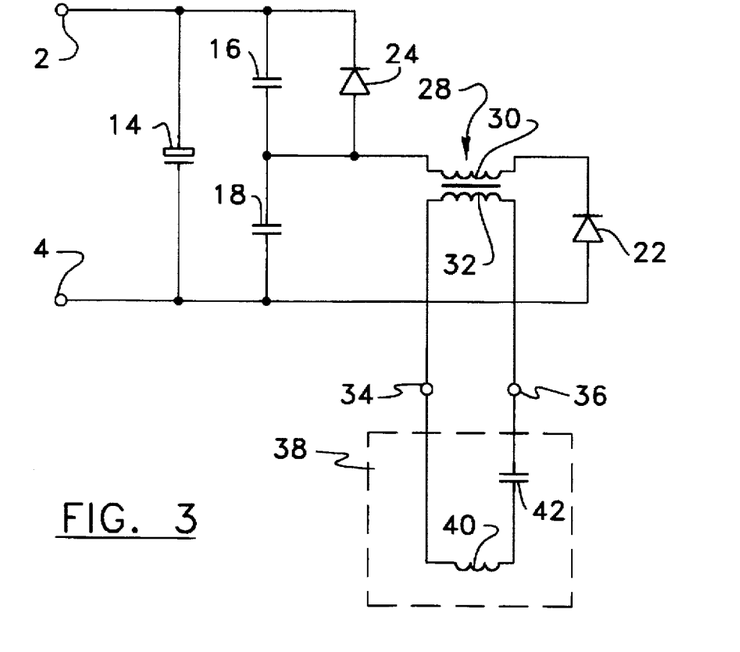
FIG. 3 is a schematic diagram of the parts of the circuit shown in FIG. 1 that are in operation after the duty cycle of the switching element shown in FIG. 2.
Figure 4:
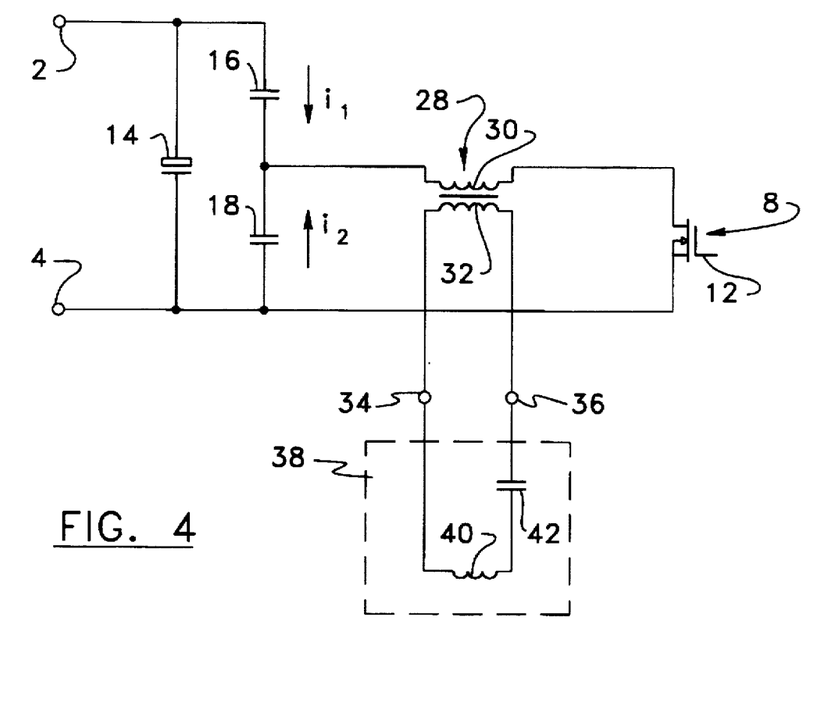
FIG. 4 is a schematic diagram of the parts of the circuit shown in FIG. 1 that are in operation during the duty cycle of the other switching element.
Figure 5:
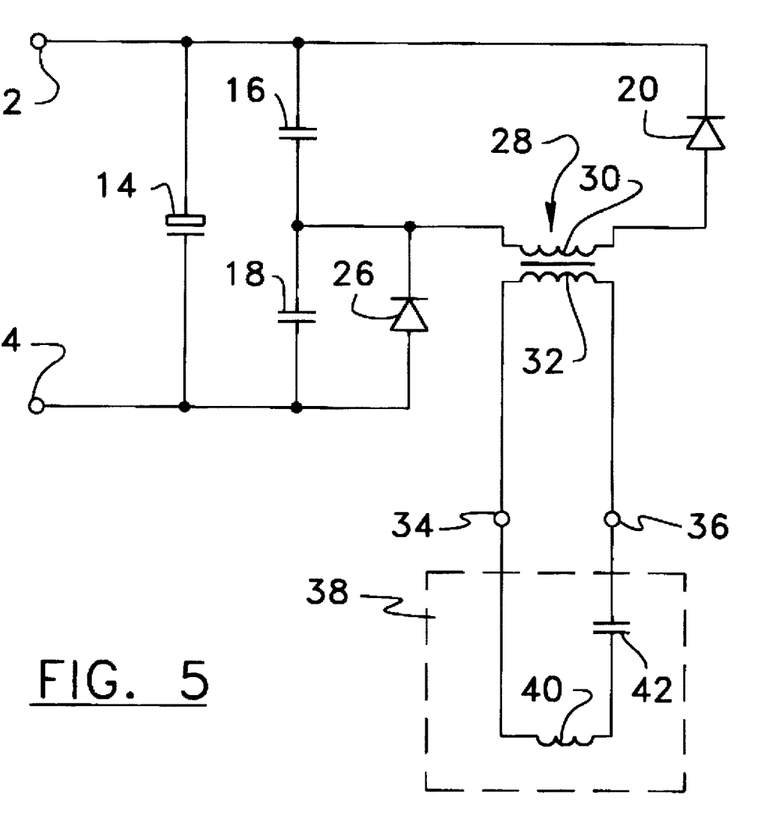
FIG. 5 is a schematic diagram of the parts of the circuit shown in FIG. 1 that are in operation after the duty cycle of the other switching element shown in FIG. 4.

Referring to FIG. 1, there is illustrated a power supply circuit according to the invention, suitable for induction heating. The circuit comprises positive and negative DC input terminals 2, 4 for connection to a DC power source. The DC power applied to the input terminals 2, 4 may be derived from an AC power source provided that it is rectified by a suitable rectifier stage (not shown in the Figure) connected between the AC power source and the input terminals 2, 4.

Figure 6A:
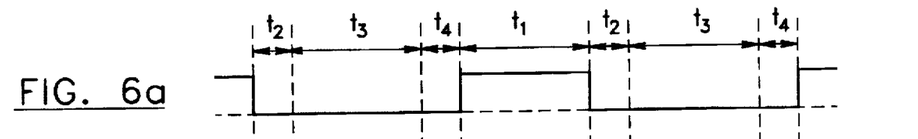
FIGS. 6a–j are time diagrams illustrating, respectively, typical waveforms of the control signal of the first switching element, the voltage across the first switching element, the voltage across the second capacitor, the current flowing in the first switching element, the control signal of the second switching element, the voltage across the second switching element, the voltage across the third capacitor, the current flowing in the second switch element, the current flowing in the primary winding of the transformer, and the voltage across the primary winding of the transformer in the circuit shown in FIG. 1 during operation.

First and second switching elements 6, 8 are connected in series between the DC input terminals 2, 4. Each switching element 6, 8 has a control input 10, 12 for receiving a control signal (as shown in FIGS. 6a and 6e) controlling a duty cycle of the switching element 6, 8. The switching elements 6, 8 may conveniently be formed of solid states electronic components as MOSFETs or IGBTs. However, any other suitable switch device can also be used.

A first capacitor 14 is connected between the DC input terminals 2, 4. Second and third capacitors 16, 18 are connected in series between the DC input terminals 2, 4. Preferably, the first capacitor 14 is an electrolytic capacitor with the capacity of some tens to hundreds of μF. The capacitors 16, 18 have usually much lower values in the range of some tenth of μF to some μF. These capacitors 16, 18 must be able to operate at high frequencies and can be charged and discharged at the appropriate rate. For example, polyester, polycarbonate, polypropylene or other types of capacitors are well suited for pulse applications.

A first pair of reverse biased rectifying elements 20, 22 in series is connected between the DC input terminals 2, 4. Each rectifying element 20, 22 of the first pair is connected in parallel with a respective one of the switch elements 6, 8. A second pair of reverse biased rectifying elements 24, 26 in series is connected between the DC input terminals 2, 4. Each rectifying element 24, 26 of the second pair is connected in parallel with a respective one of the second and third capacitors 16, 18. The rectifying elements 20, 22, 24, 26 may conveniently be formed of free wheeling diodes. However, any other suitable rectifying electronic component can also be used.

The power supply circuit also comprises a transformer 28 including a primary winding 30 having opposite winding ends connected between the rectifying elements 20, 22 of the first pair and between the rectifying elements 24, 26 of the second pair respectively, and a secondary winding 32 having opposite winding ends. A pair of output terminals 34, 36 are connected to the winding ends of the secondary winding 32 of the transformer respectively, to supply power to the load 38 which is, in this case, a resonant circuit formed by an induction coil in series with a resonant capacitor bank depicted by the capacitor 42, having a predetermined resonance frequency Fc.

Since certain types of MOSFETs and IGBTs comprise anti-parallel diodes, these diodes may be used to form the rectifying elements 20, 22 of the first pair.

In the case of FIG. 1, the power supply circuit is used as an inverter for the resonant circuit 38 connected to the output terminals 34, 36. For this purpose, the second and third capacitors 16, 18 and the primary winding 30 of the transformer 28 have capacitance and inductance values chosen so that at an end of each duty cycle of the switching elements 6, 8 and when the switching elements 6, 8 are operated alternately at a frequency higher and close to the resonance frequency of the resonant circuit 38, and when a supply voltage is applied to the DC input terminals 2, 4, one of the second and third capacitors 24, 26 is substantially fully discharged and the other one of the second and third capacitors 24, 26 is substantially fully charged to the supply voltage that is applied to the primary winding 30 of the transformer 28. In this configuration, the power supply circuit also acts as a resonant circuit.

The inverter for inductive heating takes advantage of the resonant circuit 38 coupled through the transformer 28 to enhance zero switching as it will become apparent from the description of the operation steps described hereinafter. Furthermore, in this configuration, the resonant circuit 38 can return the unused energy in the induction coil 40 back to the electrolytic capacitor 14 in the bridge via the transformer 28 and diodes 22, 24 or 20, 26.

The primary winding 30 of the transformer 28 is subjected to the maximum DC supply voltage at the beginning of each duty cycle of the switching elements 6, 8. The voltage gradually decreases to zero at the end of the duty cycles, providing zero voltage switching with minimum losses on the switching elements (transistors). Therefore, the power supply circuit according to the invention operates as in a full bridge configuration while having a half bridge configuration.

The maximum energy which can be transferred during each duty cycle is restricted by the sum of the energies required to charge and discharge the capacitors 24, 26. Thus the maximum wattage of the power supply circuit is predetermined and cannot exceed the limit. This permits to reduce the power rating of the transistors 6, 8, the number of transistors in parallel if required and the size of their heat sinks. Furthermore, there is no longer the need for external transistor protection such as shunts, inductors and electronics to monitor and process the current ratings. It permits to make more compact, reliable and efficient power supply circuits. Due to the reduced switching losses, transistors 6, 8 with lower power endurance can be used.

The resonant capacitors 16, 18 in the bridge of the present circuit are subjected to a DC variation only and the polarity of the capacitors 16, 18 do not change, unlike prior art circuits where resonance capacitors in the primary side are subjected to an AC voltage causing losses due to the loss factor tan (δ).

The switching frequency of the transistors 6, 8 is greater than the resonant frequency Fc of the resonant circuit 38 connected to the output terminals 34, 36. The output power can be easily adjusted by modifying the switching frequency of the transistors 6, 8 with respect to the resonant frequency Fc of the resonant circuit 38. The transferred power can thus be reduced by increasing the switching frequency with respect to the resonance frequency Fc, and be increased by reducing the switching frequency toward Fc.

The output voltage provided by the power supply circuit on the output terminals 34, 36 can be at some tens of watts to many tens of thousands of watts, as determined by the power rating of the components. In addition, such a power supply circuit exhibits an efficiency of about 90% or better, is of high reliability due to the reduced switching losses, and satisfies the conventional EMI requirements with respect to harmonics and transients introduced into the power lines due to a nearly perfect resonant mode. EMI and harmonics are indeed reduced due to the nearly sinusoidal performances of the bridge configuration. It also improves the efficiency of the power supply circuit due to fewer losses in the transistors 6, 8 and resonant capacitors 16, 18 in the bridge and protective devices.

The operation of this configuration at frequencies higher but very close to Fc is divided into four repetitive steps. They are schematically represented in FIGS. 2, 3, 4 and 5, while the voltages and currents at various points in the circuit are shown in FIGS. 6a–j.

Figure 6B:
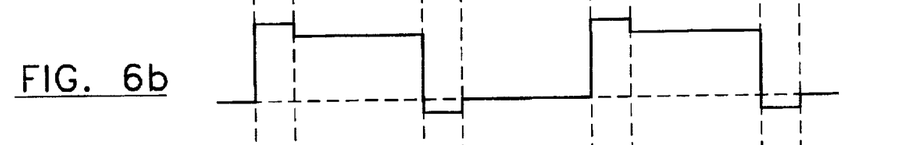
Figure 6C:
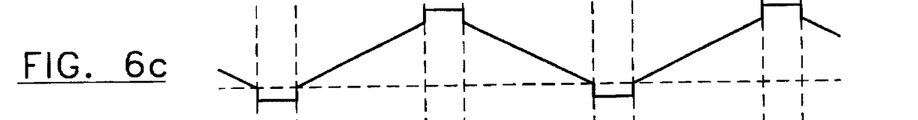
Figure 6D:
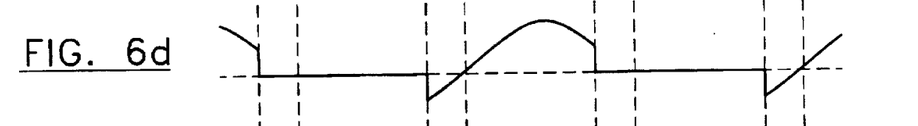
Figure 6E:
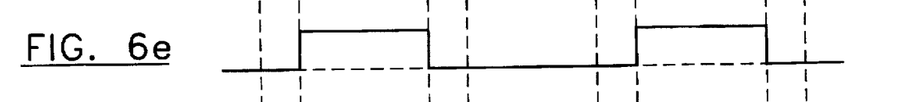

Referring to FIGS. 2 and 6a–j, the first step, corresponding to the time interval $t_1$, consists of the closing of the transistor 6. As shown in FIG. 6b, the drain-source voltage on transistor 6 is then close to 0 V, thus the transistor 6 is switched ON. Two currents flow across the transformer primary winding 30 and the transistor 6, namely the current $i_1$ that discharges the capacitor 16, whose voltage decreases to zero as shown in FIG. 6c, and the current $i_2$ that flows from the electrolytic capacitor 14 and charges the capacitor 18 to the supply voltage.

Figure 6F:
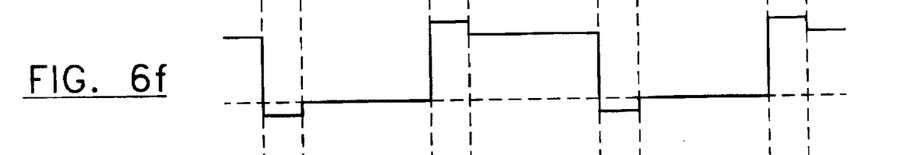
Figure 6G:
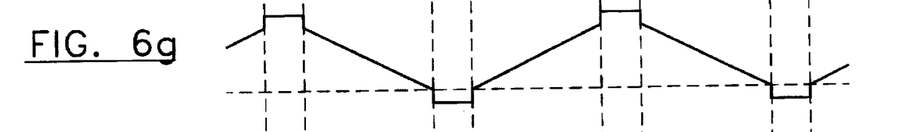
Figure 6H:
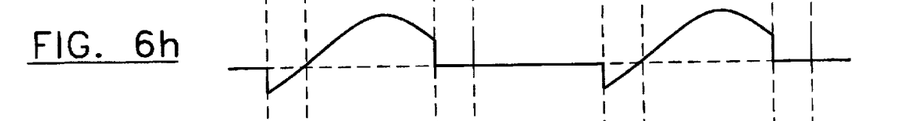
Figure 6I:
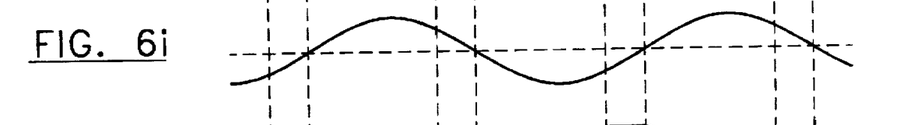
Figure 6J:
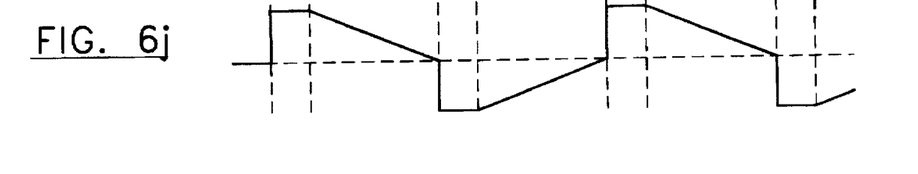

Referring to FIGS. 3 and 6a–j, the second step, corresponding to the time interval $t_2$, consists of the switching OFF of the transistor 6 under zero voltage conditions. As shown in FIG. 6j, the voltage applied on the primary winding 30 of the transformer 28 at the beginning of $t_2$ is equal to 0 V. In these conditions, the current in the primary winding 30, as shown in FIG. 6i, continues to flow in the same direction and finds its way by passing through the free wheeling diodes 22, 24 and charges the electrolytic capacitor 14 and the capacitor 18. This returned energy slightly increases the voltage of the capacitor 14 due to its much higher capacity. As shown in FIG. 6f, the voltage across the transistor 8 drops to –0.6 V due to forward current in the diode 22 and the transistor 8. The voltage across the capacitor 42 also increases slightly due to this current flow. The voltage across the transistor 8 gradually increases from –0.6 V (diode forward voltage drop) to zero.

Referring to FIGS. 4 and 6a–j, the third step, corresponding to the time interval $t_3$, consists of the closing of the transistor 8. As shown in FIG. 6f, the drain-source voltage on the transistor 8 is then equal to 0 V, thus the transistor 8 is switched ON. Two currents flow across the transformer primary winding 30 and the transistor 8, namely the current $i_2$ which discharges the capacitor 18, and the current $i_1$ which flows from the electrolytic capacitor 14 and also charges the capacitor 16 to the supply voltage.

Referring to FIGS. 5 and 6a–j, the fourth step, corresponding to the time interval $t_4$, consists of the switching OFF of the transistor 8 under zero voltage conditions. As shown in FIG. 6j, the voltage applied on the primary winding 30 at the beginning of $t_4$ has returned back to 0 V. In these conditions, the current in the primary winding 30 continues to flow in the same direction and finds its way by passing through the free wheeling diodes 26, 20 and charges the electrolytic capacitor 14 and the capacitor 16. This slightly increases the voltage of the capacitor 14. The voltage across the transistor 6 drops to –0.6 V due to forward current in the diode 20 and the transistor 6. The voltage across the capacitor 42 also increases slightly due to this flow. The voltage across the transistor 6 gradually increases to zero.

The above steps are then reiterated.

As it can be readily understood, the four rectifying elements 20, 22, 24, 26 (diodes) are essential for the proper operation of the circuit. Without these diodes, during operation sequences, in the second and fourth steps, one capacitor 16, 18 would charge to reverse polarity. This would require that the other capacitor 16, 18 be charged to a voltage greater than the input voltage on the DC terminals 2, 4 because the sum of the capacitor's voltages must be equal to the input voltage. In such a case, more energy would be transferred from the resonator. This effect would increase at each cycle, and consequently a voltage much higher than the input voltage would be applied on the switching transistors 6, 8, passing their safe operating area (SAF), which would eventually result in a catastrophic failure of the bridge.

Referring to FIGS. 6i–j, there are shown the voltage and current across the transformer 28 respectively. The alternating current on the primary winding 30 of the transformer 28 is induced in the transformer secondary and energizes the induction coil 40 and the capacitor bank 42. A portion of the current is then transferred to the load placed inside the induction coil 40 and causes Eddy currents. The remaining or unused energy, is then induced back in the transformer's primary winding 30, passes through the free wheeling diodes 20, 26 or 22, 24, and then returns to the capacitor 14 shown in FIG. 1. The current follows the same direction as the one in the transistors 6, 8. If there is enough material in the coil 40 and most of the energy in the coil 40 is consumed, the voltage amplitude across the capacitor 42 decreases and very little energy returns to the bridge. Otherwise, if there is not enough load in the coil 40 or if it is not absorbed, most of the energy returns to the bridge. Therefore, the effect of load variation on the operation of the bridge is practically eliminated.

In each half cycle, the energy $Q_1$ passing through the transformer's primary winding 30, required to charge one capacitor 16, 18 close to the full DC voltage and discharge the other capacitor 16, 18 close to zero is equal to:

$$Q_1 = \frac{CV^2}{2} + \frac{CV^2}{2} = CV^2$$

where C is the capacitance of the capacitors 16, 18 and V is the supply voltage.

The total energy per cycle is thus equal to:

$$Q_2 = 2 \times Q_1 = 2CV^2$$

and the total power W in Watt (energy/second) is equal to:

$$W = 2F_cCV^2$$

This relation can be used to calculate the values of the capacitors in the bridge as:

$$C = \frac{W}{2F_cV^2}$$

where W is the power (watt), Fc is the resonance frequency (Hz), V is the supply voltage (volt) and C is the value of each capacitor in the bridge (F).

The maximum power, induced to the induction coil 40, at resonance frequency Fc, is then equal to $2F_cCV^2$.

For example, in an inverter operating with a 170 V DC supply voltage, at a frequency of 50 KHz, and delivering 1 KW, the capacity of the capacitors 16, 18 would be equal to 0.34 µF. In an inverter operating with a 850 V DC supply voltage, at a frequency of 65 KHz, and delivering 50 KW, the capacity of the capacitors 16, 18 would be equal to 0.53 µF.

The dynamic of the process and voltages and currents flowing in the circuit depends on the amount of consumed energy in the induction coil 40, and also on the differences between the switching frequency of the transistors 6, 8 and the resonance frequency Fc. Therefore, adjustment and balancing of the switching frequency and the duty cycle of the switching transistors 6, 8 should be achieved in relation to the resonance frequency Fc and the amount of used and returned energy from the induction coil 40 in such a way that the switching frequency of the transistors 6, 8 remains greater than the resonance frequency Fc of the induction coil 40, and very importantly, the timing of the switching transistors 6, 8 should be in accordance with the flow of currents and applied voltage in the circuit. Since the capacitors 16, 18 do not play a major role in the resonance frequency fc, a simple way to estimate the resonance frequency fc of the resonant circuit 38 is by using the following well known equation:

$$f_c = \frac{1}{2\pi \sqrt{LC}}$$

where L is the inductance of the induction coil 40 and C is the capacitance of the capacitor bank 42.

Figure 7:
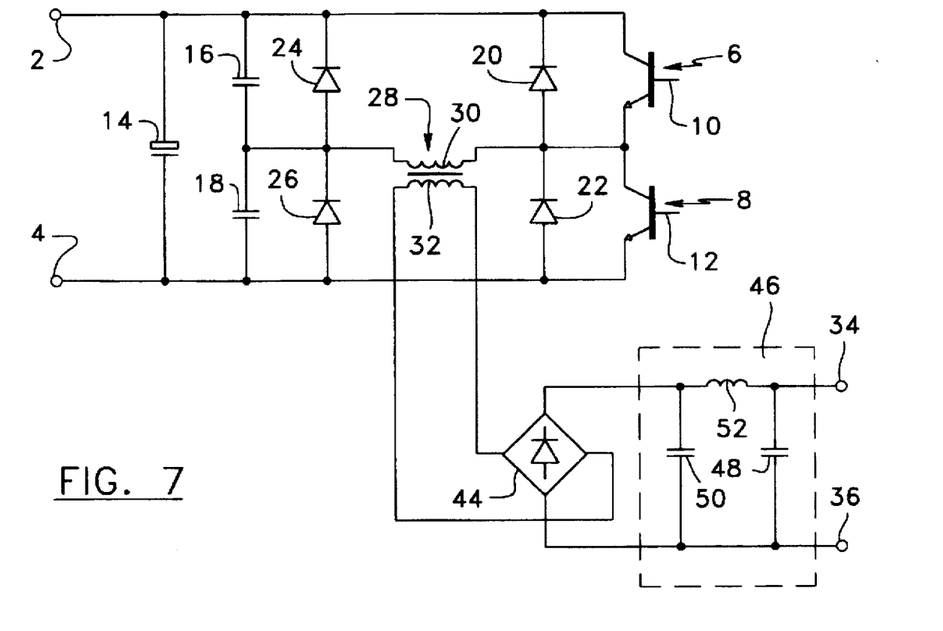
FIG. 7 is a schematic diagram of a switching power supply circuit used as a converter according to the invention.
Figure 8:
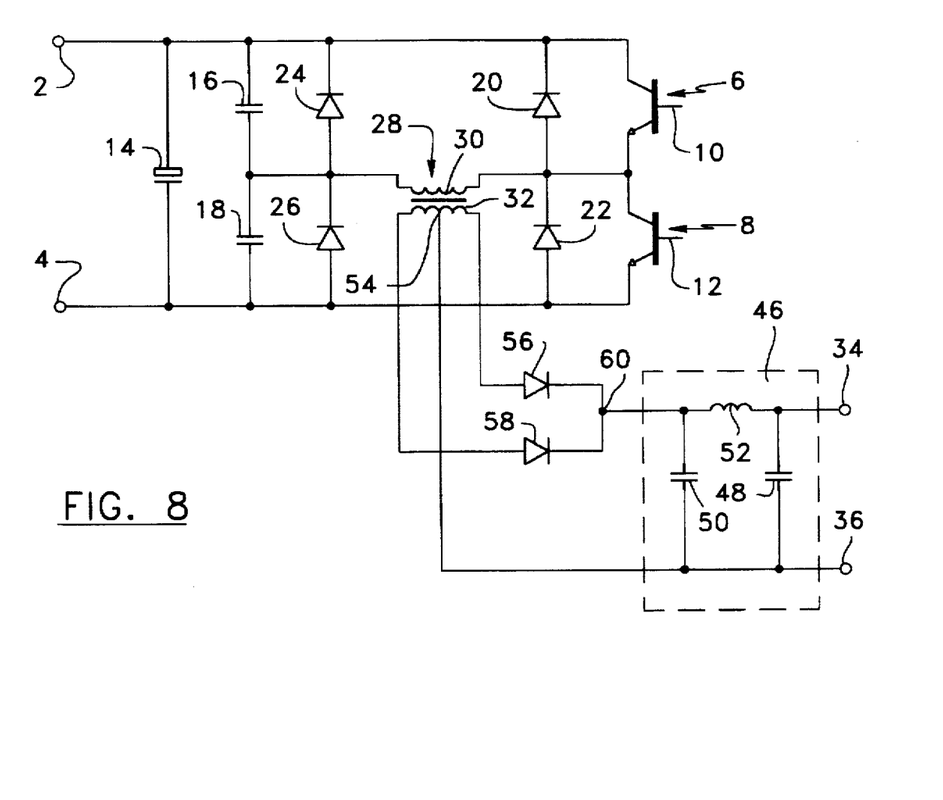
FIG. 8 is a schematic diagram of a switching power supply circuit used as a DC/DC converter according to the invention.
Figure 9:
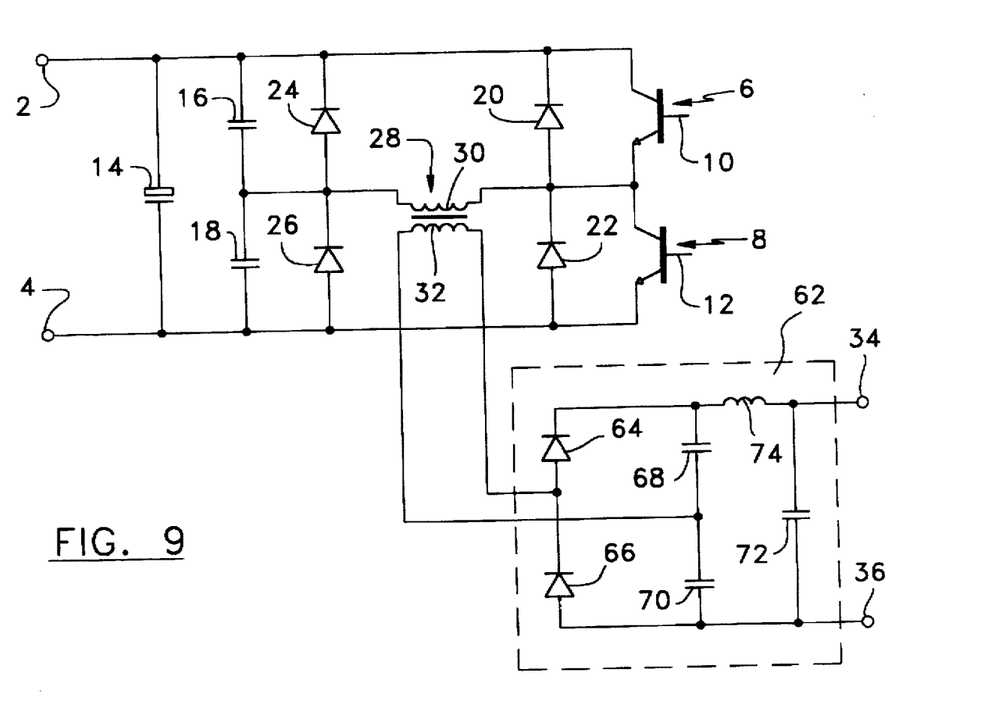
FIG. 9 is a schematic diagram of a switching power supply circuit used as a high voltage DC/DC converter according to the invention.

By changing the ratio of turns in the transformer and changing the output configuration, the power supply circuit can be used as a high current and/or high voltage converter with all the advantages obtained by the invention. Three examples of such a modification are shown in FIGS. 7, 8 and 9. In these cases, the resonant frequency fc is calculated with the same above-mentioned formula, except that L is the total inductance of the transformer 28 (both primary and secondary windings 30, 32), and C is the capacitance of the capacitor 16 or 18.

Referring to FIG. 7, there is shown a DC/DC converter using a full bridge rectifier 44 and a filter circuit 46 consisting of two capacitors 48, 50 and an inductor 52. The rectifier 44 has an input connected to the winding ends of the secondary winding 32 of the transformer 28, and an output. The filter circuit 46 has an input connected to the output of the rectifier 44, and an output connected to the output terminals 34, 36, to produce a DC supply voltage.

Referring to FIG. 8, there is shown a high current DC/DC converter. In this case, the transformer 28 is provided with a center tap 54. The full bridge rectifier shown in FIG. 7 is replaced by a pair of rectifying elements 56, 58 that has first ends connected to the winding ends of the secondary winding 32 of the transformer 28 respectively, and second ends connected at a common connection point 60, to conduct current in a direction of the connection point. The filter circuit 46 has an input connected between the connection point 60 and the center tap 54 of the secondary winding 32 of the transformer 28, and an output connected to the output terminals 34, 36, to produce a high current DC supply voltage.

Referring to FIG. 9, there is shown a high voltage DC/DC converter using a voltage multiplier circuit 62 consisting of diodes 64, 66, capacitors 68, 70, 72, and an inductor 74. The voltage multiplier circuit 62 has an input connected to the winding ends of the secondary winding 32 of the transformer 28, and an output connected to the output terminals 34, 36, to produce a high DC supply voltage.

While several embodiments of this invention have been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

What is claimed is:

1. A resonant switching power supply circuit comprising:
   positive and negative DC input terminals;
   first and second switching elements connected in series between the DC input terminals, each switching element having a control input for receiving a control signal controlling a duty cycle of the switching element;
   a first capacitor connected between the DC input terminals;
   second and third capacitors connected in series between the DC input terminals;
   a first pair of reverse biased rectifying elements connected in series between the DC input terminals, each rectifying element of the first pair being connected in parallel with a respective one of the switch elements;
   a second pair of reverse biased rectifying elements connected in series between the DC input terminals, each rectifying element of the second pair being connected in parallel with a respective one of the second and third capacitors;
   a transformer including a primary winding having opposite winding ends connected between the rectifying elements of the first pair and between the rectifying elements of the second pair respectively, and a secondary winding having opposite winding ends; and
   a pair of output terminals connected to the winding ends of the secondary winding of the transformer respectively, to supply power.

2. A circuit according to claim 1, wherein the rectifying elements are free wheeling diodes.

3. A circuit according to claim 1, wherein the switching elements are transistors.

4. A circuit according to claim 3, wherein the transistors are MOSFETs.

5. A circuit according to claim 3, wherein the transistors are IGBTs.

6. A circuit according to claim 3, wherein the transistors comprise anti-parallel diodes forming the rectifying elements of the first pair.

7. A circuit according to claim 1, wherein the capacitors are electrolytic capacitors.

8. A circuit according to claim 1, for use as an inverter for a resonant circuit connected to the output terminals, the resonant circuit having a predetermined resonance frequency, wherein:
   the second and third capacitors and the primary winding of the transformer have capacitance and inductance values chosen so that at an end of each duty cycle of the switching elements and when the switching elements are operated alternately at a frequency higher and close to the resonance frequency of the resonant circuit, one of the second and third capacitors is substantially fully discharged and the other one of the second and third capacitors is substantially fully charged to supply a voltage to the primary winding of the transformer.

9. A circuit according to claim 8, wherein the resonant circuit comprises an inductive load in series with a capacitor bank.

10. A circuit according to claim 1, for use as a converter, further comprising:
    a full bridge rectifier having an input connected to the winding ends of the secondary winding of the transformer, and an output; and
    a filter circuit having an input connected to the output of the full bridge rectifier, and an output connected to the output terminals, to produce a DC supply voltage.

11. A circuit according to claim 1, for use as a converter, wherein:
    the secondary winding of the transformer has a center tap; and the circuit further comprises:
    a pair of rectifying elements having first ends connected to the winding ends of the secondary winding of the transformer respectively, and second ends connected at a common connection point, to conduct current in a direction of the connection point; and
    a filter circuit having an input connected between the connection point and the center tap of the secondary winding of the transformer, and an output connected to the output terminals, to produce a high current DC supply voltage.

12. A circuit according to claim 1, for use as a converter, the circuit further comprising a voltage multiplier having an input connected to the winding ends of the secondary winding of the transformer, and an output connected to the output terminals, to produce a high DC supply voltage.

* * * * *